Patented Aug. 22, 1950

2,519,886

UNITED STATES PATENT OFFICE 2,519,886

BETA-DIMETHYLAMINOETHYLPHENOTHIAZINES AND THEIR PRODUCTION

Paul Charpentier, Choisy-le-Roi, France, assignor to Societe des Usines Chimiques Rhone-Poulenc, Paris, France, a French body corporate No Drawing. Application February 27, 1946, Serial No. 650,747. In France March 5, 1945

4 Claims. (Cl. 260—243)

This invention concerns new and useful phenothiazine derivatives and processes of producing the same.

As the result of protracted research and experimentation, I have now unexpectedly discovered a new class of phenothiazine derivatives which have a marked antidyspnoeic and anti-histaminic activity and therefore an important therapeutic value.

These new phenothiazine derivatives are characterised by possessing a dialkylaminoalkyl substituent on the ring nitrogen atom. A preferred class of such derivatives conform to the general formula:

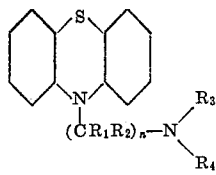

in which $R_1$ and $R_2$ are members of the class consisting of hydrogen atoms and alkyl groups (for example, methyl, ethyl and propyl), $R_3$ and $R_4$ represent alkyl groups (for example, methyl, ethyl, propyl, butyl) and $n$ represents an integer greater than 1 ($n$ may conveniently represent, for example, 2, 3, 4 or 5). The benzene nuclei may be substituted by alkyl or alkoxy groups. It should be understood that the designation $$(CR_1R_2)_n$$

as used in this specification and in the appended claims covers not only straight aliphatic chains in which the successive $CR_1R_2$ groups are identical, but also branched aliphatic chains in which successive $CR_1R_2$ groups may be different. For example, the said designation includes the branched chain —$CH_2$—$C(CH_3)_2$—.

These new derivatives may be prepared by the action on phenothiazine, or a substituted phenothiazine, of a dialkylaminoalkyl halide in the presence of a halogen-acid-binding agent, preferably sodamide. Preferably, the reaction is effected at elevated temperature and in the presence of an organic diluent.

The present invention is illustrated by the following, non-limitative examples:

Example I 60 g. of phenothiazine, 240 g. of xylene and 14 g. of sodamide (85%) are mixed and heated under reflux. 40 g. of diethylaminochloroethane are then added little by little during one hour and thirty minutes while maintaining the temperature of the reaction mixture; heating under reflux is then continued for a further hour. The mixture is cooled, taken up in 800 cc. of water and slightly acidified with hydrochloric acid. The xylene is decanted, and the aqueous layer neutralised with a little caustic soda and filtered. The filtrate is then rendered strongly alkaline and the base which separates extracted with ether. The ether layer is decanted, dried, the ether driven off and the residue rectified under vacuum. There are thus recovered 63 g. of N-diethylaminoethylphenothiazine, which boils at 200–205° C. under 1.1 mm. of mercury. This base gives an hydrochloride melting at 174–175° C. (Maquenne block).

In the same way, there may be prepared N-diethylamino-propyl-phenothiazine which boils at 213–215° C. under 1.5 mm. and N-dimethylamino-ethyl-phenothiazine which boils at 183–187° C. under 1 mm. and the hydrochloride of which melts at 201–201.5° C. (Maquenne block).

Example II 30 g. of phenothiazine, 120 g. of xylene and 7 g. of sodamide (80%) are mixed and heated under reflux. 23 g. of 3-dimethylamino-1-chloropropane, diluted with its own weight of xylene, is then added little by little during one hour, while maintaining the temperature of the reaction mixture; heating under reflux is then continued for a further hour. After cooling, the mixture is taken up in 400 cc. of water and rendered slightly acid with hydrochloric acid. The xylene is decanted, the aqueous layer is rendered strongly alkaline with caustic soda and the base which separates is extracted with ether. On rectification of the ether extract, there is obtained N - (3'-dimethyl - amino - propyl)-phenothiazine which boils at 208–210° C. under 3 mm. The hydrochloride of this base melts at 181° C. (Maquenne block).

Example III

Following the method of Example II but using an equal quantity of 1'-dimethylamino-2-chloropropane instead of 3-dimethylamino-1-chloropropane, there is obtained N-(2'-dimethylamino-2-methyl-ethyl)-phenothiazine which boils at 190–192° C. under 3 mm. The corresponding hydrochloride melts at 204° C. (Maquenne block).

Example IV

A mixture of 20 g. of 2-methoxy-phenothiazine (prepared according to the method of Pummerer-Gassner, B. 46,2325, 1913), 80 g. of xylene and 4.4 g. of sodamide (85%) is heated under reflux. There is added little by little over a period of one hour while maintaining the temperature of the reaction mixture 11.5 g. of dimethylaminochloroethane, diluted with its own weight of xylene; heating under reflux is then continued for a further period of one hour. The reaction mixture is then treated in accordance with the procedure of Example II when there is obtained N-(2'-diamethylamino-ethyl)-2-methoxy-phenothiazine which boils at 220–223° C. under 3 mm. The hydrochloride of this base melts at 182° C. (Maquenne block).

*Example V*

A mixture of 20 g. of 2-methoxy-phenothiazine, 80 g. of xylene and 4.4 g. of sodamide (85%) is heated under reflux. There is then added little by little over a period of one hour 13 g. of 1-dimethylamino-2-chloro-propane diluted with its own weight of xylene; the heating under reflux is then continued for a further period of one hour. The reaction mixture is then treated as described in Example II when there is obtained N-(2'-dimethylamino-1'-methyl-ethyl)-2-methoxy-phenothiazine which boils at 218–222° C. under 3 mm.

*Example VI*

A mixture of 20 g. phenothiazine, 80 g. of xylene and 5 g. of sodamide (85%) is heated under reflux. There is then added little by little over a period of one hour 17 g. of 1-dimethylamino-2:2-dimethyl-3-chloro-propane, diluted with its own weight of xylene; heating under reflux is then continued for a further period of one hour. On treating the reaction mixture in accordance with the method of example II there is obtained N-(3'-dimethylamino-2':2'-dimethylpropyl-phenothiazine which boils at 196–199° C. under 3 mm.

I claim:

1. The new compounds of the class consisting of β-dimethylaminoethyl phenothiazine of the formula:

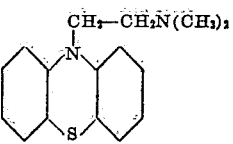

and the hydrochloride thereof.

2. The new compound, consisting of β-dimethylaminoethyl phenothiazine hydrochloride.

3. Process for the preparation of new therapeutically valuable amino derivatives of phenothiazines of the class consisting of

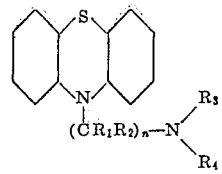

(in which $R_1$ and $R_2$ are selected from the class consisting of hydrogen atoms and alkyl groups, $R_3$ and $R_4$ represent alkyl groups and $n$ is an integer greater than 1) which process comprises reacting a member of the class consisting of phenothiazine itself, corresponding compounds containing alkyl substituents in the benzene nuclei and corresponding compounds containing alkoxy substituents in the benzene nuclei with a dialkylaminoalkyl halide in the presence of sodamide as condensing agent.

4. The process of making β-dimethylaminoethyl phenothiazine which comprises reacting phenothiazine with β-dimethylaminoethyl chloride in the presence of sodamide and separating the product.

PAUL CHARPENTIER.

REFERENCES CITED

The following references are of record in the file of this patent:

FOREIGN PATENTS

| Number | Country | Date |
|---|---|---|
| 518,207 | Germany | Feb. 9, 1931 |

OTHER REFERENCES

Gilman et al., Jour. Am. Chem. Soc., vol. 66, pages 888–892 (1944).